United States Patent
Senoue

(10) Patent No.: US 11,424,479 B2
(45) Date of Patent: Aug. 23, 2022

(54) ALL-SOLID-STATE BATTERY AND METHOD FOR MANUFACTURE THEREOF

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 16/366,372

(22) Filed: Mar. 27, 2019

(65) Prior Publication Data
US 2019/0334201 A1    Oct. 31, 2019

(30) Foreign Application Priority Data
Apr. 27, 2018   (JP) .............................. JP2018-086170

(51) Int. Cl.
| | |
|---|---|
| *H01M 4/02* | (2006.01) |
| *H01M 10/0562* | (2010.01) |
| *H01M 10/0585* | (2010.01) |
| *H01M 10/0525* | (2010.01) |
| *H01M 4/38* | (2006.01) |

(52) U.S. Cl.
CPC ....... *H01M 10/0562* (2013.01); *H01M 4/386* (2013.01); *H01M 4/387* (2013.01); *H01M 10/0525* (2013.01); *H01M 10/0585* (2013.01); *H01M 2004/021* (2013.01); *H01M 2004/027* (2013.01); *H01M 2220/20* (2013.01); *H01M 2300/0071* (2013.01)

(58) Field of Classification Search
None
See application file for complete search history.

(56) References Cited

U.S. PATENT DOCUMENTS

| | | | | |
|---|---|---|---|---|
| 7,070,706 | B2 * | 7/2006 | Chu ....................... | B82Y 30/00 |
| | | | | 252/62.2 |
| 8,304,115 | B1 * | 11/2012 | Petkov ................ | H01M 50/431 |
| | | | | 429/304 |
| 10,686,216 | B2 * | 6/2020 | Fujinoki ............. | H01M 4/1391 |
| 2014/0154583 | A1 * | 6/2014 | Ueki ................... | H01M 10/625 |
| | | | | 429/246 |
| 2016/0380250 | A1 * | 12/2016 | Umeyama ........... | H01M 50/411 |
| | | | | 429/145 |
| 2017/0033352 | A1 * | 2/2017 | Mizutani .......... | H01M 10/0562 |
| 2018/0166743 | A1 * | 6/2018 | Lee ..................... | H01M 10/052 |

FOREIGN PATENT DOCUMENTS

JP          2017-054720 A       3/2017

\* cited by examiner

*Primary Examiner* — Tracy M Dove
(74) *Attorney, Agent, or Firm* — Oliff PLC

(57) ABSTRACT

The solid electrolyte layer of the all-solid-state battery disclosed herein includes insulating inorganic filler particles (hollow particles) having a hollow shape at least before the initial charging. Preferably, Fs/Ns which is the ratio of an average particle diameter (Fs) of the filler particles to an average particle diameter (Ns) of the negative electrode active material is 0.25 or less at least before the initial charging. Also, preferably, Fp/Nv which is the ratio of a hollow volume (Fp) created by the hollow particles included in the solid electrolyte layer per unit area before the initial charging to an expansion volume (Nv), which is a difference between a volume after full charging and a volume before the initial charging in the negative electrode active material layer per unit area, is at least 0.1.

17 Claims, 2 Drawing Sheets

ALL-SOLID-STATE BATTERY AND METHOD FOR MANUFACTURE THEREOF

CROSS-REFERENCE TO RELATED APPLICATIONS

This application claims priority based on Japanese Patent Application No. 2018-086170 filed on Apr. 27, 2018, the entire contents of which are incorporated herein by reference.

BACKGROUND OF THE INVENTION

1. Field of the Invention

The present invention relates to an all-solid-state battery including a solid electrolyte, and more particularly to a structure of a solid electrolyte layer of an all-solid-state battery.

2. Description of the Related Art

A secondary battery capable of realizing a comparatively high output and a high capacity, such as a lithium ion secondary battery, is important as a power source to be mounted on a vehicle that uses electricity as a driving source, or as a power source installed in electric products such as personal computers and portable terminals. In particular, lithium ion secondary batteries that are lightweight and provide high energy density are preferable as high-output power sources for driving vehicles such as electric vehicles (EV), plug-in hybrid vehicles (PHV), and hybrid vehicles (HV), and demand for such batteries is expected to grow.

Such a high-output secondary battery can be exemplified by a secondary battery in which a powdery solid electrolyte is used instead of a liquid electrolyte (electrolytic solution), such a battery being also called an all-solid-state battery.

Since an all-solid-state battery does not use a liquid electrolyte (in particular, a nonaqueous electrolytic solution), a laminated electrode body of a laminated structure composed of a positive electrode, a negative electrode and a solid electrolyte layer can be easily formed without a complicated treatment involving handling of an organic solvent such as a nonaqueous electrolytic solution. In addition, since no electrolytic solution is used, the structure of the electrode body is simplified, which can also contribute to improvement of battery capacity per unit volume of the battery. For this reason, such a battery is expected to be a high-output power source for driving a vehicle which requires a higher capacity. For example, JP 2017-054720 A introduces an example of a negative electrode and a negative electrode material (negative electrode active material) for use in an all-solid-state battery suitable for realizing high energy density and capacity retention rate.

SUMMARY

One of the problems of the conventional all-solid-state batteries is that expansion and shrinkage of the active material at the time of charging and discharging can cause gaps and cracks at the interface between the solid electrolyte layer functioning also as a separator layer and the positive and negative electrode electrolyte layers. For example, in the case of using a Si-based or Sn-based negative electrode active material having a relatively large degree of expansion and shrinkage at the time of charging and discharging as a negative electrode active material, where the negative electrode active material layer is stretched in the direction (hereinafter referred to as "horizontal direction of electrode body") perpendicular to the lamination direction of the laminated electrode body, the solid electrolyte layer in contact with the negative electrode active material layer is also pulled in the horizontal direction, and gaps or cracks can occur in the solid electrolyte layer. Gaps and cracks in the horizontal direction of the electrode body generated in the solid electrolyte layer are undesirable because they also cause a short circuit between the positive and negative electrodes.

As a means for preventing the occurrence of gaps and cracks in the solid electrolyte layer due to the expansion of the active material at the time of initial charging, appropriate voids are provided in advance in the solid electrolyte layer, and when the active material (particularly, a negative electrode active material) is expanded, the voids collapse, thereby buffering the expansion stress. However, when the laminated electrode body is pressed in the lamination direction in the process of constructing the all-solid-state battery, the voids can be crushed, and it is difficult to stably maintain the voids until the initial charging. Regarding this issue, it is conceivable to perform the pressing with a relatively weak pressure so as not to crush the voids, but this cannot be a practical solution because such pressing makes it impossible to ensure sufficient bonding between the solid electrolyte and the positive electrode active material and the negative electrode active material in the laminated structure, and battery resistance can be greatly increased.

The present invention has been accomplished to solve the conventional problems relating to such all-solid-state batteries, and an object of the present invention is to provide a technique for suppressing the generation of gaps and cracks, which can affect battery performance, in a solid electrolyte layer and adjacent positive and negative active material layers due to expansion of the active material at the time of charging and discharging (in particular, initial charging of battery assembly) and to suppress deterioration of battery performance due to the gaps and cracks. More specifically, the present invention provides an all-solid-state battery and a method for manufacturing an all-solid-state battery that embody such an object.

In order to achieve the above object, there is provided an all-solid-state battery comprising an electrode body of a laminated structure having a positive electrode active material layer including a positive electrode active material and a solid electrolyte, a negative electrode active material layer including a negative electrode active material and a solid electrolyte, and a solid electrolyte layer including a solid electrolyte.

The solid electrolyte layer of the all-solid-state battery disclosed herein includes insulating inorganic filler particles (hereinafter also referred to simply as "hollow particles") having a hollow shape at least before the initial charging.

In a preferred embodiment, an Fs/Ns ratio of an average particle diameter (Fs) of the hollow particles to an average particle diameter (Ns) of the negative electrode active material is 0.25 or less at least before the initial charging.

In a preferred embodiment, where a ratio of a hollow volume (Fp) created by the hollow particles included in the solid electrolyte layer per unit area before the initial charging and an expansion volume (Nv), which is a difference between a volume after full charging and a volume before the initial charging in the negative electrode active material layer per unit area, is denoted by Fp/Nv, the Fp/Nv ratio is at least 0.1.

A specific feature of the all-solid-state battery disclosed herein is that the hollow particles are contained in the solid electrolyte layer. Unlike the voids between the solid electrolyte particles in the solid electrolyte layer, the space inside the hollow particles (that is, the hollow volume) is protected by the shell portion of the hollow particles and is unlikely to be crushed by the pressing treatment, and it is possible to stably maintain the hollow volume until the initial charging is performed.

Meanwhile, when the expansion stress is generated in the horizontal direction of the electrode body due to the expansion of an active material (typically, a negative electrode active material) at the time of initial charging, the hollow particles yield and collapse, so that the expansion stress is buffered and it is possible to prevent the occurrence of large gaps or cracks which affect the battery performance in the solid electrolyte layer. Therefore, with the all-solid-state battery disclosed herein, it is possible to prevent deterioration of battery performance due to expansion of an active material (typically, a negative electrode active material) at the time of initial charging and to maintain favorable battery performance (for example, capacity retention rate).

Here, "initial charging" means the first charging to be performed in a SOC region used for charging and discharging the target all-solid-state battery. Further, "full charging" does not necessarily require SOC to be 100%, and it may be a substantially upper limit SOC set in the target all-solid-state battery. Typically, the SOC can be set between 80% and 100% (preferably between 90% and 100%).

Note that one embodiment of the all-solid-state battery disclosed herein is a battery assembly before the initial charging, in other words, a state in which the initial charging has not been performed.

In a preferred embodiment of the all-solid-state battery disclosed herein, the volume ratio (Fv) occupied by the hollow particles in the total volume of the solid electrolyte layer is 37% or less at least before the initial charging.

With the all-solid-state battery of such a configuration, it is possible to ensure sufficient electric conductivity of the solid electrolyte layer and prevent the occurrence of large gaps and cracks in the solid electrolyte layer without raising the internal resistance of the battery.

In a preferred embodiment of the all-solid-state battery disclosed herein, the solid electrolyte layer includes titanium oxide particles and/or aluminum oxide particles having a hollow shape at least before the initial charging as the inorganic filler particles.

Hollow particles composed of titanium oxide and aluminum oxide have relatively high physical strength and can stably maintain the shape against pressing treatment at the time of battery construction. Also, such particles can be procured at low cost. Therefore, these hollow particles are suitable for achieving the above object.

In a preferred embodiment of the all-solid-state battery disclosed herein, the negative electrode active material layer includes active material particles including Si or Sn as a constituent element as the negative electrode active material.

A negative electrode active material including Si or Sn as a constituent element is known to have a large degree of expansion and shrinkage at the time of charging and discharging and is an active material suitable for implementing the technique disclosed herein.

As another aspect for attaining the abovementioned object, there is provided a method for manufacturing an all-solid-state battery. That is, the manufacturing method disclosed herein is a method for manufacturing an all-solid-state battery comprising an electrode body of a laminated structure having a positive electrode active material layer including a positive electrode active material and a solid electrolyte, a negative electrode active material layer including a negative electrode active material and a solid electrolyte, and a solid electrolyte layer including a solid electrolyte, the method including the steps of:

forming a laminated electrode body including the positive electrode active material layer, the negative electrode active material layer, and the solid electrolyte layer;

pressing the laminated electrode body in the lamination direction;

connecting a positive electrode terminal and a negative electrode terminal to the pressed laminated electrode body to form a battery assembly; and performing initial charging on the battery assembly.

Further, the solid electrolyte layer includes a solid electrolyte and insulating inorganic filler particles having a hollow shape, Fs/Ns, which is a ratio of an average particle diameter (Fs) of the hollow particles to an average particle diameter (Ns) of the negative electrode active material, is 0.25 or less, and an Fp/Nv ratio of a hollow volume (Fp) created by the particles in the solid electrolyte layer per unit area before the initial charging to an expansion volume (Nv), which is a difference between a volume after full charging and a volume before the initial charging in the negative electrode active material layer per unit area, is at least 0.1.

According to the manufacturing method having such a configuration, the above-described all-solid-state-battery disclosed herein can be manufactured.

In a preferred embodiment, the volume ratio (Fv) occupied by the particles in the total volume of the solid electrolyte layer is 37% or less.

According to such a manufacturing method, it is possible to provide an all-solid-state battery in which sufficient electric conductivity of the solid electrolyte layer is ensured and the occurrence of large gaps and cracks in the solid electrolyte layer is prevented without raising the internal resistance of the battery.

In a preferred embodiment, the solid electrolyte layer is prepared to include titanium oxide particles and/or aluminum oxide particles having a hollow shape as the particles.

In yet another preferred embodiment, the negative electrode active material layer is prepared to include active material particles including Si or Sn as a constituent element as the negative electrode active material.

DETAILED DESCRIPTION OF THE PREFERRED EMBODIMENTS

Hereinafter, preferred embodiments of the all-solid-state battery disclosed herein will be described with reference to the drawings as appropriate. Incidentally, matters other than those particularly mentioned in the present description and necessary for the implementation of the present invention can be grasped by a person skilled in the art as design matters which are based on the related art in the pertinent field. Numerical ranges A to B (A and B are arbitrary numbers) in the present description are assumed to indicate A or more and B or less.

In the present description, the "(positive and negative electrode) active material" refers to a substance participating in occlusion and release of charge carriers (for example, lithium ions in a lithium ion secondary battery) on the positive electrode side or the negative electrode side.

In the following description, an all-solid-state lithium ion secondary battery is taken as an example of an application target of the technique disclosed herein, but the present invention is not limited thereto. The all-solid-state battery disclosed herein may be of a type that uses another metal ion as a charge carrier, for example, a sodium ion secondary battery, a magnesium ion secondary battery, or the like.

Figure 1:
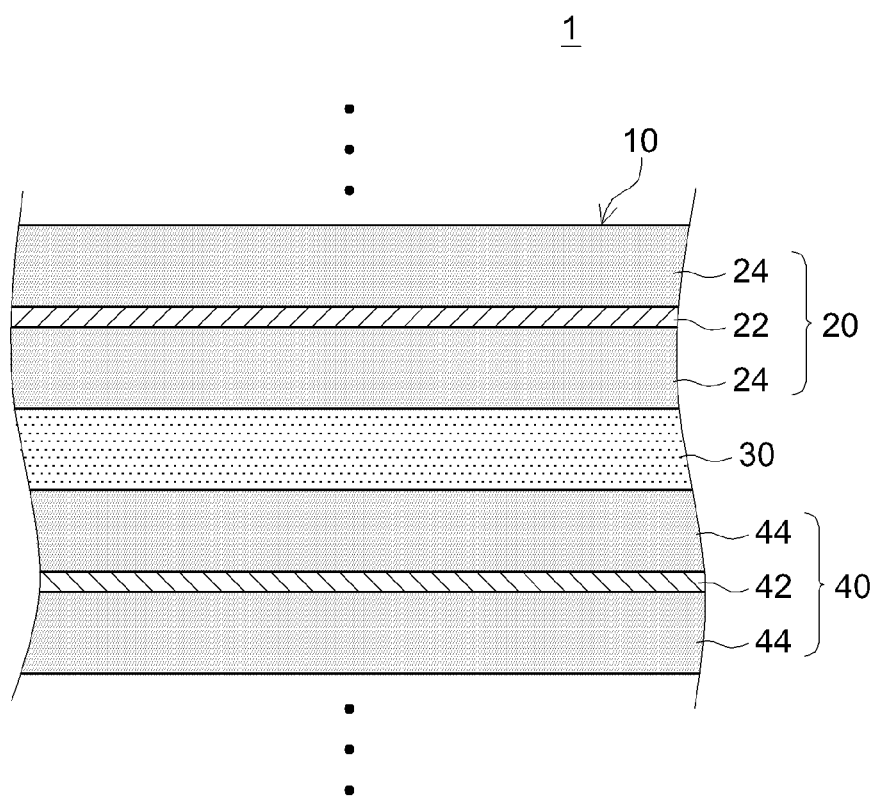
FIG. 1 schematically illustrates a configuration of an all-solid-state battery including a laminated electrode body.

FIG. 1 schematically illustrates an all-solid-state battery (all-solid-state lithium ion secondary battery) 1 provided with a laminated electrode body 10 having a typical laminated structure. That is, generally speaking, the all-solid-state lithium ion secondary battery 1 according to the present embodiment is mainly configured of a laminated electrode body 10 configured by laminating a predetermined number of sheet-shaped positive electrodes 20 and sheet-shaped negative electrodes 40, while interposing solid electrolyte layers (separator layers) 30 between the positive and negative electrodes.

As shown in the figure, the positive electrode 20 includes a positive electrode current collector 22 made of an aluminum foil or the like, and a positive electrode active material layer 24 which includes a predetermined positive electrode active material and a solid electrolyte and is formed on both sides of the positive electrode current collector. In addition, the negative electrode 40 includes a negative electrode current collector 42 made of a copper foil or the like, and a negative electrode active material layer 44 which includes a predetermined negative electrode active materials and a solid electrolyte and is formed on both sides of the negative electrode current collector.

The solid electrolyte layer 30 includes the same kind of solid electrolyte as that contained in the positive and negative electrode active material layers 24 and 44 and also functions as a separator for insulating between the positive and negative electrodes. Next, each layer constituting the laminated electrode body 10 will be described in detail.

Positive electrodes which have been used in batteries of this type can be used without particular limitation as the positive electrode 20 included in the all-solid-state lithium ion secondary battery 1 according to the present embodiment.

Positive electrode current collectors which have been used in batteries of this type can be used without particular limitation as the positive electrode current collector 22. Typically, a metal positive electrode current collector having good electric conductivity is preferable, and the collector can be configured of a metal material, for example, such as aluminum, nickel, titanium, stainless steel or the like. Aluminum (for example, aluminum foil) is particularly preferable. The thickness of the positive electrode current collector 22 is not particularly limited, but from the standpoint of balance between the capacity density of the battery and the strength of the current collector, a thickness of about 5 μm to 50 μm is suitable, and about 8 μm to 30 μm is more preferable.

The positive electrode active material layer 24 includes a positive electrode active material and a solid electrolyte and, if necessary, may further include a conductive material and a binder (binding material).

Examples of the solid electrolyte that can be used include various oxide-based solid electrolytes or sulfide-based solid electrolytes. Preferable examples of the oxide-based solid electrolyte include various oxides having a NASICON structure, a garnet type structure, or a perovskite type structure.

For example, a compound represented by the general formula $Li_xAO_y$ (wherein A is B, C, Al, Si, P, S, Ti, Zr, Nb, Mo, Ta, or W, and x and y are positive real numbers) can be mentioned. Specific examples thereof include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. Alternative suitable examples include glass or glass ceramics of a $Li_2O$—$B_2O_3$—$P_2O_5$ type, $Li_2O$—$SiO_2$ type, $Li_2O$—$B_2O_3$ type, $Li_2O$—$B_2O_3$—ZnO type and the like.

In particular, use of a sulfide-based solid electrolyte is preferable because such electrolyte has high ion conductivity. For example, glass or glass ceramics of a $Li_2S$—$SiS_2$ type, $Li_2S$—$P_2S_3$ type, $Li_2S$—$P_2S_5$ type, $Li_2S$—$GeS_2$ type, $Li_2S$—$B_2S_3$ type, $Li_3PO_4$—$P_2S_5$ type and $Li_4SiO_4$—$Li_2S$—$SiS_2$ type can be mentioned.

From the viewpoint of realizing higher ionic conductivity, it is preferable to use a $Li_2S$-based solid solution composed of $Li_2S$ and a lithium halide (for example, LiCl, LiBr, and LiI). Preferred examples thereof include LiBr—$Li_2S$—$P_2S_5$, LiI—$Li_2S$—$P_2S_5$, LiBr—LiI—$Li_2S$—$P_2S_5$ and the like.

The average particle diameter ($D_{50}$) of the solid electrolyte particles to be used which is determined by a laser diffraction/scattering method is suitably, for example, about 0.5 μm to 10 μm, and particularly preferably about 1 μm to 5 μm.

Various compounds which have been conventionally used in batteries of this type can be used as the positive electrode active material included in the positive electrode active material layer 24. Suitable examples include composite oxides with a layered structure typified by $LiCoO_2$, $LiNiO_2$, $LiNi_xCo_yMn_{(1-x-y)}O_2$ (where $0<x<1$; $0<y<1$; $0<x+y<1$). Alternatively, composite oxides having a spinel structure such as $Li_2NiMn_3O_8$, $LiMn_2O_4$, $Li_{1+x}Mn_{2-y}M_yO_4$ (wherein M is absent or one or more metal elements selected from Al, Mg, Co, Fe, Ni, and Zn; $0\leq x<1$; $0\leq y<2$) and composite compounds having an olivine structure such as $LiFePO_4$, and the like can be used.

The average particle diameter ($D_{50}$) of the positive electrode active material to be used which is determined by a laser diffraction/scattering method is suitably, for example, about 0.5 μm to 20 μm, and particularly preferably about 1 μm to 10 μm.

Particularly preferable positive electrode active materials include those in which at least a part of the surface of the active material particles is covered with a film made of a solid electrolyte. In particular, it is preferable to use a positive electrode active material coated with an oxide-based solid electrolyte. As a result of using the positive electrode active material particles coated with a solid electrolyte, the positive electrode active material and the solid electrolyte in the positive electrode active material layer 24 can be adhered more favorably.

The thickness of the solid electrolyte film covering the positive electrode active material particles is not particularly limited, but is preferably such that does not greatly hinder the electron conductivity. For example, it is preferable that the average film thickness be 0.1 nm to 100 nm. In addition, the coverage of the solid electrolyte film in the surface area of the positive electrode active material particles is preferably 30% or more, more preferably 40% or more.

The compounding ratio of the positive electrode active material and the solid electrolyte in the positive electrode active material layer 24 is not particularly limited. Typically, the mass ratio (P:S) of the positive electrode active material (P) and the solid electrolyte (S) may be about 50:50 to 95:5.

The thickness of the positive electrode active material layer 24 is not particularly limited. Typically, the thickness can be 10 μm to 500 μm.

Similarly to the positive electrode active material layers of the conventional batteries of this type, the positive electrode active material layer 24 can include various optional components in addition to the positive electrode active material and the solid electrolyte. For example, a conductive material, a binder, or the like can be included. As the conductive material, carbon black such as acetylene black or other carbon materials (graphite, carbon nanotube, and the like) can be suitably used. As the binder, a fluorine-based binder such as polyvinylidene fluoride (PVDF) or polytetrafluoroethylene (PTFE) or a rubber-based binder such as styrene butadiene rubber (SBR) or the like can be suitably used.

Negative electrodes which have been used in batteries of this type can be used without particular limitation as the negative electrode 40 included in the all-solid-state lithium ion secondary battery 1 according to the present embodiment.

Negative electrode current collectors which have been used in batteries of this type can be used without particular limitation as the negative electrode current collector 42. Typically, a metal negative electrode current collector having good electric conductivity is preferable, and for example, copper (for example, copper foil) or an alloy mainly including copper can be used. The thickness of the negative electrode current collector 42 is not particularly limited, but from the standpoint of balance between the capacity density of the battery and the strength of the current collector, a thickness of about 5 μm to 50 μm is suitable, and about 8 μm to 30 μm is more preferable.

The negative electrode active material layer 44 includes a negative electrode active material and a solid electrolyte, and may further include a binder or the like, if necessary.

The solid electrolyte included in the negative electrode active material layer 44 may be the same as that contained in the above-described positive electrode active material layer 24, and redundant description thereof is omitted.

Various compounds which have been conventionally used in batteries of this type can be used as the negative electrode active material included in the above-described negative electrode active material layer 24. For example, a carbon-based negative electrode active material such as graphite, mesocarbon microbeads, carbon black (acetylene black, Ketjen black, and the like) can be used.

Further, from the viewpoint of realizing the above-mentioned object, a negative electrode active material having a high energy density and a large degree of expansion and shrinkage at the time of charging and discharging can be suitably employed. A negative electrode active material of this type can be exemplified by a material including silicon (Si) or tin (Sn) as a constituent element.

Specifically, a silicon (Si) based negative electrode active material can be exemplified by Si, silicon oxide represented by $SiO_a$ (where $0.05<a<1.95$), silicon carbide represented by $SiC_b$ ($0<b<1$), silicon nitride represented by $SiN_c$ ($0<c<4/3$), and the like.

Other examples of the silicon-based negative electrode active material are alloy materials comprising silicon and an element other than silicon. Examples of elements other than silicon include Fe, Co, Sb, Bi, Pb, Ni, Cu, Zn, Ge, In, Sn, Ti and the like.

Meanwhile, a Sn-based negative electrode active material can be exemplified by tin, tin oxide, tin nitride, tin-containing alloys and the like, solid solutions thereof, and the like. Some of tin atoms contained in these compounds may be substituted with one or two or more elements.

The oxide can be exemplified by tin oxide represented by $SnO_d$ ($0<d<2$), tin dioxide ($SnO_2$) and the like. Examples of the tin-containing alloys include Ni—Sn alloys, Mg—Sn alloys, Fe—Sn alloys, Cu—Sn alloys, Ti—Sn alloys and the like. Examples of the tin compound include $SnSiO_3$, $Ni_2Sn_4$, $Mg_2Sn$ and the like.

The average particle diameter ($D_{50}$) of the negative electrode active material which is determined by a laser diffraction/scattering method is suitably, for example, about 1 μm to 20 μm, and particularly preferably about 2 μm to 10 μm.

The thickness of the negative electrode active material layer 44 is not particularly limited. Typically, the thickness can be 10 μm to 500 μm.

The compounding ratio of the negative electrode active material and the solid electrolyte in the negative electrode active material layer 44 is not particularly limited. Typically, the mass ratio (N:S) of the negative electrode active material (N) and the solid electrolyte (S) may be about 50:50 to 95:5.

Similarly to the negative electrode active material layers of the conventional batteries of this type, the negative electrode active material layer 44 can include various optional components in addition to the negative electrode active material and the solid electrolyte. For example, a conductive material, a binder, or the like can be included in the same manner as in the positive electrode active material 24. As the conductive material, carbon black such as acetylene black or other carbon materials (graphite, carbon nanotube, and the like) can be suitably used. As the binder, a fluorine-based binder such as PVDF and PTFE or a rubber-based binder such as SBR or the like can be suitably used.

Various solid electrolytes such as those in the conventional batteries of this type can be included in the solid electrolyte layer 30 provided in the all-solid-state lithium ion secondary battery 1 according to the present embodiment.

A solid electrolyte of the same type as that included in the above-described positive electrode active material layer 24 can be suitably used in the solid electrolyte layer 30, and redundant description thereof is omitted.

A specific feature of the all-solid-state battery disclosed herein is that hollow particles, that is, insulating inorganic filler particles having a hollow shape, are included in the solid electrolyte layer.

Hollow particles have an outer shell portion and a hollow portion formed inside the outer shell portion, and it is preferable that the hollow particles to be included in the solid electrolyte layer 30 have a shape and size such that make it difficult for the solid electrolyte to enter the hollow portion. Therefore, the average particle diameter ($D_{50}$) of the hollow particles may be smaller than the average particle diameter ($D_{50}$) of the solid electrolyte particles contained in the solid electrolyte layer 30. It is more preferable that the size of the hollow particles to be used be determined such that the particle diameter ($D_{90}$), which is the cumulative 90% of the hollow particles in the particle size distribution measured based on the laser diffraction/scattering method, is smaller than the $D_{50}$ of the solid electrolyte particles included in the solid electrolyte layer 30. Typically, the average particle diameter ($D_{50}$) measured on the basis of the laser diffraction/scattering method is suitably about 0.1 μm to 10 μm, and particularly preferably about 0.2 μm to 5 μm.

In the hollow particles to be used, the Fs/Ns ratio of the average particle diameter (Fs) of the hollow particles to the average particle diameter (Ns) of the negative electrode active material present in the adjacent negative electrode active material layer 40 is 0.25 or less (for example, 0.1 to 0.25) at least before the initial charging of the assembled all-solid-state lithium ion secondary battery, and it is particularly preferably that Fs/Ns be 0.15 or less (for example, 0.1 to 0.15). By providing such a difference in particle diameter, it is possible to perform substantially uniform exchange of Li ions at the entire interface between the solid electrolyte layer 30 and the negative electrode active material layer 40. It is undesirable for the Fs/Ns to be too large (for example, Fs/Ns of 0.6 or more), since the exchange of Li ions at the interface between the solid electrolyte layer 30 and the negative electrode active material layer 44 tends to be nonuniform.

The amount of the hollow particles in the solid electrolyte layer 30 is not particularly limited as long as ion conduction paths are sufficiently secured in the solid electrolyte layer 30, but where the ratio of the hollow volume (Fp) created by the hollow particles included in the solid electrolyte layer 30 per unit area before the initial charging of the assembled all-solid-state lithium ion secondary battery and an expansion volume (Nv), which is a difference between a volume after full charging and a volume before the initial charging in the negative electrode active material layer 44 per unit area, is denoted by Fp/Nv (in other words, a difference between the volume of the negative electrode active material included in the negative electrode active material layer 44 after the full charging and the volume thereof before the initial charging), the ratio Fp/Nv (hereinafter referred to as "expansion relaxation rate") is at least 0.1.

Figure 2:
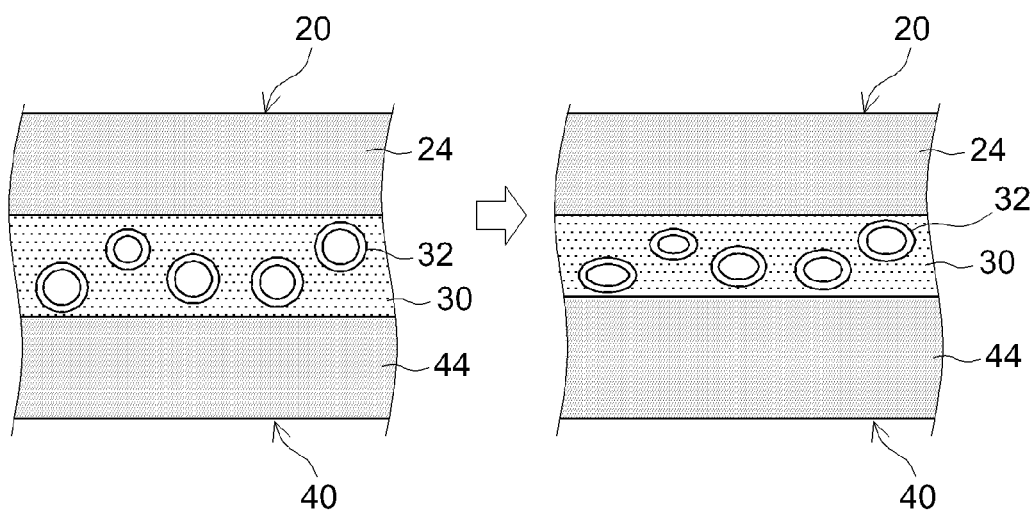
FIG. 2 schematically illustrates the shape change of hollow particles at the time of initial charging.

As schematically shown in FIG. 2, when the expansion relaxation rate is 0.1 or more, the hollow particles 32 yield and collapse when the expansion stress is generated in the horizontal direction of the laminated electrode body 10 due to expansion of the negative electrode active material layer 44 (that is, negative electrode active material) at the time of initial charging, so that the expansion stress in the horizontal direction can be suitably buffered. Therefore, it is possible to suitably prevent the occurrence of large gaps and cracks which affect battery performance in the solid electrolyte layer.

Such an expansion relaxation rate is particularly preferably 0.2 or more, and further preferably 0.3 or more. Meanwhile, from the viewpoint of maintaining the battery performance without excessively raising the internal resistance, it is preferable that the expansion relaxation rate be about 0.8 or less, particularly preferably 0.72 or less (for example, 0.5 or less).

The expansion relaxation rate can be easily measured by fully charging the target all-solid-state battery as explained in Test Example 2 described hereinbelow.

As a preferred example, the volume ratio Fv occupied by the hollow particles in the total volume of the solid electrolyte layer is preferably 37% or less, and particularly preferably 20% or less, at least before the initial charging. Further, Fv is preferably 10% or more, and particularly preferably 15% or more. Within this range of Fv, it is possible to effectively suppress the generation of gaps and cracks, which can affect battery performance, in the solid electrolyte layer and the adjacent positive and negative electrode active material layers due to expansion of the active material, while ensuring sufficient electric conductivity of the solid electrolyte layer 30, in other words, the ion conduction paths.

The hollow particles to be used are not particularly limited as long as the particles are insulating inorganic filler particles that have a hollow shape and can realize the above-mentioned object, but the preferred particles can maintain the hollow area, without collapsing when the assembled laminated electrode body 10 is pressed at a predetermined pressure (typically, 50 MPa to 500 MPa, for example, 2 tons/cm$^2$ to 4 tons/cm$^2$), and can buffer the expansion stress applied in the horizontal direction of the electrode body during the expansion of the negative electrode active material layer at the time of initial charging.

Hollow particles for attaining such an object are exemplified by various insulating inorganic compound particles. Typical examples include titanium oxide, aluminum oxide, zirconium oxide, cesium oxide, silicon carbide, silicon nitride, and the like. Among them, use of hollow titanium oxide particles or aluminum oxide particles is preferable, because such particles are relatively inexpensive and have hardness preventing them from cracking under the pressing pressure.

Such hollow particles can be manufactured by various manufacturing methods known in the art. These methods are exemplified by an organic particle template method using organic particles such as polystyrene beads as a template (core), an inorganic particle template method using inorganic particles such as iron oxide as a template (core) and utilizing a redox reaction, an emulsion template method for manufacturing hollow particles in emulsion, and a spray pyrolysis method for forming hollow particles in a gas phase. Since a method for manufacturing such hollow particles does not itself characterize the present invention, a detailed description thereof will be omitted.

In addition to the solid electrolyte and the hollow particles, the solid electrolyte layer 30 can include various optional components as well as the conventional solid electrolyte layer of this type of battery. For example, it may contain a binder or the like as with the positive and negative electrode active material layers.

As long as the all-solid-state lithium ion secondary battery 1 disclosed herein has the above-described configuration, the manufacturing process is not limited. Typically, the manufacturing process includes a step of forming a laminated electrode body including a positive electrode active material layer, a negative electrode active material layer, and a solid electrolyte layer, a step of pressing the laminated electrode body in a stacking direction thereof, a step of accommodating the pressed laminated electrode body in a predetermined exterior body to form a battery assembly, and a step of performing initial charging on the battery assembly (that is, the laminated electrode body).

For example, similarly to the conventional batteries of this type, each of the positive electrode active material layer 24, the negative electrode active material layer 44, and the solid electrolyte layer 30 can be formed by preparing a paste (slurry) composition including the above-described various components, coating the paste (slurry) composition on the positive electrode current collector 22 or the negative electrode current collector 42, drying, and pressing under an appropriate pressure (for example, about 5 MPa to 300 MPa).

Then, the laminated electrode body 10 can be fabricated by laminating the positive electrode 20 on which the positive electrode active material layer 24 is formed, the negative electrode 40 on which the negative electrode active material layer 44 is formed, and the solid electrolyte layer 30 formed on the positive electrode collector 22 or the negative electrode collector 42.

Next, by pressing the laminated electrode body 10 at a predetermined pressing pressure (for example, 2 tons/cm² to 4 tons/cm²), the mechanical strength of the laminated electrode body 10 and the electric conductivity (that is, the ion conduction paths) in each layer are improved. Then, a battery assembly can be obtained by connecting a positive electrode terminal and a negative electrode terminal (not shown) for external connection respectively to the positive electrode 20 and the negative electrode 40 of the laminated electrode body 10.

The target all-solid-state battery (in the present embodiment, an all-solid-state lithium ion secondary battery) 1 can then be manufactured by subjecting the obtained battery assembly to an initial charging treatment and then initial discharging treatment and optionally to an appropriate aging treatment.

Similarly to the conventional batteries of this type, the all-solid-state battery 1 according to the present embodiment is accommodated in an exterior body (not shown) having a shape corresponding to the shape of the laminated electrode body 10. The material constituting the exterior body is not particularly limited. For example, from the viewpoint of high physical strength, heat dissipation property and the like, an exterior body made of a metal (for example, made of aluminum) can be preferably use. Alternatively, the exterior body may be composed of a laminate film which excels in loading property and makes it possible to reduce the weight of the entire battery module. A preferable example in this case is a laminate film having a three-layer structure in which a metal layer is disposed between two synthetic resin layers.

In addition, when the all-solid-state battery disclosed herein is used as a high-output power source for driving a vehicle, a plurality of all-solid-state batteries is connected to each other to construct a battery module (also referred to as a battery pack). Since the form of such a battery module does not characterize the present invention, a detailed description thereof will be omitted.

Hereinafter, several test examples relating to the all-solid-state battery (here, all-solid-state lithium ion secondary battery) disclosed herein will be described, but the present invention is not intended to be limited to the configurations disclosed in these test examples.

Test Example 1: Manufacture of All-Solid-State Battery

A total of nine types of all-solid-state lithium ion secondary batteries of Samples 1 to 9 were manufactured by the process described below.
Sample 1
Fabrication of Solid-Electrolyte-Coated Positive Electrode Active Material A $LiNi_{1/3}Mn_{1/3}Co_{1/3}O_2$ powder having an average particle diameter ($D_{50}$) of 6 μm as measured by the laser diffraction/scattering method was used as the positive electrode active material. Then, $LiNbO_3$ was coated on the surface of the positive electrode active material by using a sol-gel method.

Specifically, equimolar amounts of $LiOC_2H_5$ and $Nb(OC_2H_5)_5$ were dissolved in an ethanol solvent to prepare a metal alkoxide solution for coating. Then, under the atmospheric pressure, the metal alkoxide solution for coating was coated on the surface of the positive electrode active material by using a rolling fluidized coating device (model: SFP-01, produced by Powrex Corporation). At that time, the treatment time was adjusted so that the thickness of the coating film was about 5 nm. Next, the coated positive electrode active material was heat treated at 350° C. under atmospheric pressure for 1 h to obtain a positive electrode active material composed of $LiNi_{1/3}Mn_{1/3}Co_{1/3}O_2$ coated on the surface with $LiNbO_3$.

Fabrication of Positive Electrode

A positive electrode was then fabricated by using the obtained positive electrode active material and a $15LiBr \cdot 10LiI \cdot 75(0.75Li_2S \cdot 0.25P_2S_5)$ glass ceramic having an average particle diameter ($D_{50}$) of 2.5 μm as measured by the laser diffraction/scattering method as a sulfide solid electrolyte.

Specifically, the positive electrode active material and the sulfide solid electrolyte were weighed such that the weight ratio of the active material to the solid electrolyte was 75:25, 4 parts of a PVDF-based binder and about 6 parts of the conductive material (acetylene black) were weighed with respect to 100 parts of the active material, and these components were blended in butyl butyrate so as to obtain a solid content of 70 wt % and then kneaded with a stirrer to obtain a composition (positive electrode paste) for forming a positive electrode active material layer.

Next, the obtained positive electrode paste was uniformly coated by blade coating using a commercially available applicator on a positive electrode current collector made of an aluminum foil having a thickness of 15 μm so as to obtain a basis weight of 25 mg/cm². Thereafter, the coating film was dried at 120° C. for about 3 min to obtain a positive electrode in which the positive electrode active material layer was formed on both sides of the positive electrode current collector made of an aluminum foil.

Fabrication of Negative Electrode

A negative electrode was fabricated by using a silicon (Si) powder having an average particle diameter ($D_{50}$) of 6 μm as measured by the laser diffraction/scattering method as a negative electrode active material and using a sulfide solid electrolyte of the same type as was used in the positive electrode.

Specifically, the negative electrode active material and the sulfide solid electrolyte were weighed such that the weight ratio of the active material to the solid electrolyte was 55:45, 6 parts of a PVDF-based binder and about 6 parts of the conductive material (acetylene black) were weighed with respect to 100 parts of the active material, and these components were blended in butyl butyrate so as to obtain a solid content of 70 wt % and then kneaded with a stirrer to obtain a composition (negative electrode paste) for forming a negative electrode active material layer.

Next, the obtained negative electrode paste was uniformly coated by blade coating using a commercially available applicator on a negative electrode current collector made of a copper foil having a thickness of 15 μm so as to obtain a basis weight of 5.6 mg/cm². Thereafter, the coating film was dried at 120° C. for about 3 min to obtain a negative electrode in which the negative electrode active material layer was formed on both sides of the negative electrode current collector made of a copper foil.

Fabrication of Hollow Particles

Titanium sulfate and urea were dissolved in distilled water to prepare a solution having a titanium sulfate concentration of 0.09 mol/L and a urea concentration of 2.3 mol/L. A total of 36 g of $Fe_2O_3$ fine particles having an average particle diameter ($D_{50}$) as measured by the laser diffraction/scattering method of 0.7 μm were added to 3000 mL of this solution. Next, the reaction was continued at 80° C. for about 10 h while stirring this suspension with a stirrer. The microparticles in the suspension were then washed by diluting with distilled water and repeating centrifugation 5 times and then dried. By this treatment, a $TiO_2$ film was formed on the surface of the $Fe_2O_3$ fine particles.

Next, the powder composed of the dried $Fe_2O_3$ fine particles was subjected to hydrogen reduction at 700° C. for about 3 h by using an atmosphere furnace to reduce the core portion made of $Fe_2O_3$ to Fe. Thereafter, the fine particles having a Fe core portion and a $TiO_2$ film formed on the surface thereof were charged into 800 mL of a 0.3 mol/L hydrochloric acid aqueous solution, and stirring was continued at 80° C. for about 5 h. As a result, the Fe core portion was dissolved, and $TiO_2$ hollow particles consisting only of the remaining $TiO_2$ coating portion were fabricated. Subsequently, the $TiO_2$ hollow particles were recovered from the hydrochloric acid aqueous solution by centrifugation, washed by adding distilled water and repeating centrifugation 5 times, and dried at 120° C. for 1 h to obtain $TiO_2$ hollow particles to be used in the present test examples. The average particle diameter based on SEM observation was 0.85 μm and the average thickness of the outer shell portion made of $TiO_2$ was 0.7 μm.

Fabrication of Solid Electrolyte Layer

A solid electrolyte layer was fabricated using the sulfide solid electrolyte used for fabricating the positive and negative electrodes. Specifically, 80 parts by weight of the sulfide solid electrolyte, 17 parts by weight of the hollow particles and 3 parts by weight of the BR (butylene rubber) based binder were weighed, blended so that the solid content was 70 wt % in a heptane solvent, and ultrasonically dispersion treated for about 2 min by using an ultrasonic dispersing device (model: UH-50, manufactured by SMT Co., Ltd.) to obtain a composition for solid electrolyte formation (solid electrolyte paste).

Subsequently, the obtained negative electrode paste was uniformly coated on an aluminum foil having a thickness of 15 μm by a procedure similar to that of the above-described fabrication of the positive electrode to obtain a basis weight of 8.5 mg/cm$^2$. Subsequent natural drying followed by drying at 100° C. for about 3 min produced a solid electrolyte layer on one side of the aluminum foil.

Fabrication of all-Solid-State Battery (Battery Assembly)

The solid electrolyte layer was punched into a square shape of 3 cm×3 cm together with aluminum foil and pressed at a pressure of 1 ton/cm$^2$. Subsequently, the positive electrode punched into the same shape was superimposed on the solid electrolyte layer and pressed at a pressing pressure of 1 ton/cm$^2$. Thereafter, the aluminum foil attached to the solid electrolyte layer was peeled off, and the negative electrode punched into the same shape was superimposed on the surface (solid electrolyte layer) and pressed at a pressing pressure of 3 tons/cm$^2$.

The laminated electrode body obtained in this way was tightly closed with an exterior body made of an aluminum laminate film provided in advance with positive and negative electrode terminals to prepare a test all-solid-state battery (all-solid-state lithium ion secondary battery) of Sample 1.

Sample 2

A test all-solid-state battery (all-solid-state lithium ion secondary battery) of Sample 2 was fabricated using the same materials and steps as in the fabrication of Sample 1, except that the compounding ratio in the fabrication of the solid electrolyte paste was changed to 62 parts by weight of the sulfide solid electrolyte and 35 parts by weight of the hollow particles.

Sample 3

A test all-solid-state battery (all-solid-state lithium ion secondary battery) of Sample 3 was fabricated using the same materials and steps as in the fabrication of Sample 1, except that the $Fe_2O_3$ fine particles used in the fabrication of hollow particles were changed to those having the average particle size of 1.4 μm.

Sample 4

A test all-solid-state battery (all-solid-state lithium ion secondary battery) of Sample 4 was fabricated using the same materials and steps as in the fabrication of Sample 1, except that the compounding ratio in the fabrication of the solid electrolyte paste was changed to 87 parts by weight of the sulfide solid electrolyte and 10 parts by weight of the hollow particles.

Sample 5

A test all-solid-state battery (all-solid-state lithium ion secondary battery) of Sample 5 was fabricated using the same materials and steps as in the fabrication of Sample 1, except that aluminum sulfate was used instead of titanium sulfate, and aluminum sulfate and urea were dissolved in distilled water to prepare a solution having an aluminum sulfate concentration of 0.03 mol/L and a urea concentration of 2.3 mol/L in the fabrication of hollow particles.

Sample 6

A test all-solid-state battery (all-solid-state lithium ion secondary battery) of Sample 6 was fabricated using the same materials and steps as in the fabrication of Sample 1, except that the hollow particles were not used and the amount of the sulfide solid electrolyte was 97 parts by weight in the fabrication of the solid electrolyte paste.

Sample 7

A test all-solid-state battery (all-solid-state lithium ion secondary battery) of Sample 7 was fabricated using the same materials and steps as in the fabrication of Sample 1, except that the compounding ratio in the fabrication of the solid electrolyte paste was changed to 92 parts by weight of the sulfide solid electrolyte and 5 parts by weight of the hollow particles.

Sample 8

A test all-solid-state battery (all-solid-state lithium ion secondary battery) of Sample 8 was fabricated using the same materials and steps as in the fabrication of Sample 1, except that the $Fe_2O_3$ fine particles used in the fabrication of hollow particles were changed to those having the average particle size of 3 μm.

Sample 9

A test all-solid-state battery (all-solid-state lithium ion secondary battery) of Sample 9 was fabricated using the same materials and steps as in the fabrication of Sample 1, except that the compounding ratio in the fabrication of the solid electrolyte paste was changed to 49 parts by weight of the sulfide solid electrolyte and 48 parts by weight of the hollow particles.

Test Example 2: Calculation of Fs/Ns and Fp/Nv of Each Sample

For each fabricated sample battery, there were calculated:
(1) Fs/Ns which is the ratio of the average particle diameter (Fs) of the hollow particles before the initial charging and the average particle diameter (Ns) of the negative electrode active material, and
(2) Fp/Nv (expansion relaxation rate) which is the ratio of the hollow volume (Fp) created by the hollow particles contained in the solid electrolyte layer per unit area before the initial charging and the expansion volume (Nv) which is the difference between the volume of the negative electrode active material layer per unit area after full charging and the volume before the initial charging.

Regarding the hollow volume (Fp), only the solid electrolyte layer was laminated and then pressed at a pressing pressure of 3 tons/cm$^2$, which was the same as that at the time of fabricating the battery of each sample, and the hollow volume (Fp) was derived based on the thickness after pressing and the weight ratio and true density of each member (material).

Further, regarding the expansion volume (Nv), which is the difference between the volume of the negative electrode active material layer per unit area after full charging and the volume before the initial charging, the battery of Sample 6, in which the entire volume of the hollow particle portion in the solid electrolyte layer in each sample was replaced with the solid electrolyte, was fully charged (SOC≈100) and the calculation was performed by assuming that the entire thickness expansion portion occurring at that time was negative electrode expansion.

Fs/Ns and Fp/Nv (expansion relaxation rate) of each sample calculated in this manner are shown in the corresponding columns of Table 1.

Test Example 3: Determination of Capacity Retention Rate and Presence or Absence of Hair Cracking in Negative Electrode by Cycle Test of Each Sample Cycle tests were conducted on the battery of each sample, and the capacity retention rate and the presence or absence of hair cracks in the negative electrode as an index of durability was visually confirmed.

The battery of each sample was constant-size restrained at 100 MPa in the lamination direction of the electrode body, charge and discharge cycles were thereafter performed under the following conditions, and the capacity retention rate at the 100th cycle to the capacity at the 1st cycle was measured. That is, charging was performed at 4.1 V-CCCV charge, current rate 15 mA, and 1 mA current cut, and discharging was performed at CC 2.5 V cut and current rate 15 mA.

After each cycle test, the battery of each sample was disassembled, and it was visually observed whether or not hair cracks due to expansion and shrinkage were initiated in the negative electrode.

These results are shown together with the volume ratio (vol %) of the hollow particles in the corresponding columns of Table 1.

TABLE 1

| Sample No. | Hollow particles | Fs/Ns | Volume ratio of hollow particles (vol %) | Expansion relaxation rate (Fp/Nv) | Capacity retention rate (%) | Hair cracks |
|---|---|---|---|---|---|---|
| 1 | TiO$_2$ | 0.14 | 17.4 | 0.33 | 91 | Absent |
| 2 | TiO$_2$ | 0.14 | 37.0 | 0.72 | 86 | Absent |
| 3 | TiO$_2$ | 0.25 | 17.4 | 0.33 | 88 | Absent |
| 4 | TiO$_2$ | 0.14 | 10.3 | 0.10 | 93 | Absent |
| 5 | Al$_2$O$_3$ | 0.14 | 17.4 | 0.33 | 91 | Absent |
| 6 | None | — | 0 | 0 | 91 | Present |
| 7 | TiO$_2$ | 0.14 | 5.1 | 0.05 | 92 | Present |
| 8 | TiO$_2$ | 0.5 | 17.4 | 0.33 | 48 | Absent |
| 9 | TiO$_2$ | 0.14 | 50 | 0.96 | Charging impossible | Charging impossible |

As is clear from the results shown in Table 1, it was recognized that hair cracking of the electrode (negative electrode) can be suppressed in each sample battery having an expansion relaxation rate of 0.1 or more. However, in Sample 9 having such an expansion relaxation rate of 0.96, since the volume ratio of the hollow particles in the solid electrolyte layer becomes too high, the internal resistance becomes excessive and battery performance cannot be maintained.

Also, in Sample 8 in which Fs/Ns was 0.5, the capacity retention rate was below 50%, which was unsuitable. This is conceivably because where the size of the hollow particles approaches the size of the negative electrode active material, the transfer of Li ions of the negative electrode active material becomes nonuniform near the interface between the solid electrolyte layer and the negative electrode active material layer, and the reaction in the negative electrode becomes unstable. Meanwhile, in each sample (except Sample 9) having Fs/Ns of 0.25 or less, the capacity retention rate was sufficient.

Although specific examples of the present invention have been described in detail above, these are merely illustrative and do not limit the scope of the claims. Techniques set forth in the claims include those in which the concrete examples exemplified above are variously modified and changed. The all-solid-state battery disclosed herein is suitable as a driving power source to be mounted on vehicles such as electric vehicles (EV), hybrid vehicles (HV), plug-in hybrid vehicles (PHV) and the like.

What is claimed is:
1. An all-solid-state battery comprising a laminated electrode body of a laminated structure having:
   a positive electrode active material layer including a positive electrode active material and a solid electrolyte;
   a negative electrode active material layer including a negative electrode active material and the solid electrolyte; and a solid electrolyte layer including the solid electrolyte, wherein the solid electrolyte layer includes insulating inorganic filler particles having a hollow shape in which a hollow core portion is formed inside of a closed outer shell portion;

an average particle diameter of the filler particles is 0.2 μm to 5 μm; and an Fs/Ns ratio of the average particle diameter (Fs) of the filler particles to an average particle diameter (Ns) of the negative electrode active material is 0.25 or less.

2. The all-solid-state battery according to claim 1, wherein a volume ratio (Fv) occupied by the filler particles in a total volume of the solid electrolyte layer is 37% or less.

3. The all-solid-state battery according to claim 1, wherein the solid electrolyte layer includes either or both of titanium oxide particles and aluminum oxide particles having the hollow shape as the inorganic filler particles.

4. The all-solid-state battery according to claim 2, wherein the solid electrolyte layer includes either or both of titanium oxide particles and aluminum oxide particles having the hollow shape as the inorganic filler particles.

5. The all-solid-state battery according to claim 1, wherein the negative electrode active material layer includes active material particles including Si or Sn as a constituent element as the negative electrode active material.

6. The all-solid-state battery according to claim 2, wherein the negative electrode active material layer includes active material particles including Si or Sn as a constituent element as the negative electrode active material.

7. The all-solid-state battery according to claim 3, wherein the negative electrode active material layer includes active material particles including Si or Sn as a constituent element as the negative electrode active material.

8. The all-solid-state battery according to claim 4, wherein the negative electrode active material layer includes active material particles including Si or Sn as a constituent element as the negative electrode active material.

9. A method for manufacturing an all-solid-state battery comprising:

a laminated electrode body of a laminated structure having a positive electrode active material layer including a positive electrode active material and a solid electrolyte;

a negative electrode active material layer including a negative electrode active material and the solid electrolyte; and a solid electrolyte layer including the solid electrolyte, the method including the steps of:

forming the laminated electrode body including the positive electrode active material layer, the negative electrode active material layer, and the solid electrolyte layer;

pressing the laminated electrode body in a lamination direction;

connecting a positive electrode terminal and a negative electrode terminal to the pressed laminated electrode body to form a battery assembly; and performing initial charging on the battery assembly, wherein the solid electrolyte layer includes the solid electrolyte and insulating inorganic filler particles having a hollow shape in which a hollow core portion is formed inside of a closed outer shell portion;

an average particle diameter of the filler particles is 0.2 μm to 5 μm; and an Fs/Ns ratio of the average particle diameter (Fs) of the filler particles to an average particle diameter (Ns) of the negative electrode active material is 0.25 or less.

10. The method for manufacturing the all-solid-state battery according to claim 9, wherein a volume ratio (Fv) occupied by the filler particles in a total volume of the solid electrolyte layer is 37% or less.

11. The method for manufacturing the all-solid-state battery according to claim 9, wherein the solid electrolyte layer includes either or both of titanium oxide particles and aluminum oxide particles having the hollow shape as the filler particles.

12. The method for manufacturing the all-solid-state battery according to claim 10, wherein the solid electrolyte layer includes either or both of titanium oxide particles and aluminum oxide particles having the hollow shape as the filler particles.

13. The all-solid-state battery according to claim 1, wherein the average particle diameter of the filler particles is from 0.85 μm to 5 μm.

14. The all-solid-state battery according to claim 1, wherein the filler particles comprise zirconium oxide, cesium oxide, silicon carbide, or silicon nitride.

15. The method for manufacturing the all-solid-state battery according to claim 9, wherein the average particle diameter of the filler particles is from 0.85 μm to 5 μm.

16. The method for manufacturing the all-solid-state battery according to claim 9, wherein a content of the filler particles in the solid electrolyte layer is from 10 percent by weight to 17 percent by weight.

17. The method for manufacturing the all-solid-state battery according to claim 9, wherein the filler particles comprise zirconium oxide, cesium oxide, silicon carbide, or silicon nitride.

* * * * *